(12) United States Patent
Mishra et al.

(10) Patent No.: US 7,046,891 B2
(45) Date of Patent: May 16, 2006

(54) LOW CUTOFF LARGE EFFECTIVE AREA OPTICAL FIBER

(75) Inventors: Snigdharaj K. Mishra, Wilmington, NC (US); Steven S. Rosenblum, Wilmington, NC (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 10/890,597

(22) Filed: Jul. 13, 2004

(65) Prior Publication Data

US 2006/0013548 A1  Jan. 19, 2006

(51) Int. Cl.
G02B 6/22 (2006.01)
G02B 6/18 (2006.01)

(52) U.S. Cl. ...................... 385/127; 385/124

(58) Field of Classification Search ......... 385/123–128
See application file for complete search history.

(56) References Cited

U.S. PATENT DOCUMENTS

| | | | |
|---|---|---|---|
| 5,483,612 A * | 1/1996 | Gallagher et al. ........... | 385/127 |
| 5,649,044 A | 7/1997 | Bhagavatula ................ | 385/124 |
| 5,781,684 A | 7/1998 | Liu ............................. | 385/124 |
| 6,031,956 A | 2/2000 | Li et al. ...................... | 385/124 |
| 6,212,322 B1 | 4/2001 | Ma et al. ..................... | 385/123 |
| 6,301,422 B1 | 10/2001 | Li ............................... | 385/127 |
| 6,324,327 B1 | 11/2001 | Herring et al. .............. | 385/123 |
| 6,421,491 B1 | 7/2002 | Liu ............................. | 385/127 |
| 6,424,777 B1 | 7/2002 | Ma et al. ..................... | 385/123 |
| 6,430,346 B1 | 8/2002 | Conradi et al. ............. | 385/123 |
| 6,490,396 B1 | 12/2002 | Smith ......................... | 385/123 |
| 6,647,191 B1 | 11/2003 | Li ............................... | 385/127 |
| 6,701,053 B1 | 3/2004 | Liu ............................. | 385/127 |
| 6,856,743 B1 * | 2/2005 | Bickham ..................... | 385/127 |
| 2004/0067034 A1 | 4/2004 | Rosenblum et al. ........ | 385/127 |

FOREIGN PATENT DOCUMENTS

WO   2004/011975   2/2004

OTHER PUBLICATIONS

Affidavit of Snigdharaj K. Mishra, dated Oct. 24, 2005, 2 pages.

* cited by examiner

*Primary Examiner*—Rodney Bovernick
*Assistant Examiner*—Omar Rojas
(74) *Attorney, Agent, or Firm*—Joseph M. Homa

(57) ABSTRACT

An optical waveguide fiber having large effective area, low slope, low cutoff, and low attenuation is disclosed. The optical fiber has at least two core segments and the inner profile volume of the core of the fiber is greater than 2.0%-$\mu m^2$.

23 Claims, 4 Drawing Sheets

LOW CUTOFF LARGE EFFECTIVE AREA OPTICAL FIBER

BACKGROUND OF THE INVENTION

1. Field of the Invention

The present invention relates to low cutoff large effective area, and in particular low cutoff, large effective area, non-zero dispersion shifted optical fibers (NZDSF), or NZDS fibers, or NZ-DSF's.

2. Technical Background

Wavelength division multiplexing (WDM) systems have operated around the 1550 nm wavelength region, defined herein as including the C-band, which includes wavelengths between about 1525 nm to about 1565, and the L-band, which includes wavelengths between about 1565 nm to about 1625 nm. Some known fibers have a zero dispersion wavelength located outside the operation window which may help prevent nonlinear penalties such as four-wave mixing (FWM) and cross-phase modulation (XPM). The zero dispersion wavelength of some known NZDSF fibers is within 100 nm of 1550 nm in order to reduce the magnitude of the dispersion of a transmitted signal in the 1550 nm operating window so as to allow longer span lengths and less frequent dispersion compensation.

Preferably, coarse wavelength division multiplexing (CWDM) systems and applications operate in the WDM 1550 nm window, i.e. in the C-and L-bands, in the S-band (between about 1450 nm and about 1525 nm), and in the 1310 nm window (between about 1280 nm and about 1330 nm).

Known fibers have optical characteristics which are suitable for operation in specific windows. For example, standard single mode transmission fibers, such as the SMF-28™ optical fiber manufactured by Corning Incorporated, have a zero dispersion wavelength at or near 1310 nm, and such fibers can perform suitably in the 1310 nm window. The dispersion exhibited by such optical fiber at 1550 nm is around 17 ps/nm/km, which is larger than the dispersion at 1550 nm of typical NZDSF fiber, and which can require frequent dispersion compensation. NZDSF optical fiber can perform suitably in the 1550 nm window. Examples of NZDSF fiber include: LEAF® fiber by Corning Incorporated which has an average zero dispersion wavelength near 1500 nm and a dispersion slope of about 0.08 ps/nm/km at about 1550 nm, Submarine LEAF® fiber by Corning Incorporated which has an average zero dispersion wavelength near 1590 nm and a dispersion slope of about 0.1 ps/nm/km at about 1550 nm, MetroCor® fiber by Corning Incorporated which has a zero dispersion wavelength near 1650 nm, and Truewave RS™ fiber by Lucent Corporation which has a zero dispersion wavelength of about 1450 nm. However, the magnitude of the dispersion in the 1310 mu window of these NZDSF optical fibers is not low, and many NZDSF fibers have specified cable cutoff wavelengths which are greater than 1260 nm.

SUMMARY OF THE INVENTION

An optical waveguide fiber having large effective area, low dispersion slope, low cutoff, and low attenuation is disclosed herein. The optical fiber has at least two core segments, a central region and an annular ring region.

Preferably, the cutoff of the optical fiber is low enough to allow single mode transmission in the 1310 nm band as well as at higher wavelengths.

The refractive index profile of the fiber is preferably selected such that the optical fiber has: an effective area greater than 60 $\mu m^2$ at a wavelength of 1550 nm; a dispersion slope less than 0.090 $ps/nm^2$-km, preferably less than 0.085 $ps/nm^2$-km; a cabled cutoff less than 1250 nm, preferably less than 1200 nm; and an attenuation at 1550 nm less than 0.20 dB/km. In some preferred embodiments, the effective area at 1550 nm is greater than 65 $\mu m^2$. In other preferred embodiments, the effective area at 1550 nm is greater than 70 $\mu m^2$. Preferably, the ratio of the dispersion divided by the dispersion slope, or kappa, is greater than 50 nm. In preferred embodiments, the dispersion slope is less than 0.08 $ps/nm^2$-km.

The inner profile volume of the relative refractive index profile is greater than 2.0%-2 than 2.5%-$m^2$, and more preferably greater than 3.0%-$\mu m^2$. In $\mu m^2$, preferably greater than 2.5%-$\mu m^2$, and more preferably greater than 3.0 some preferred embodiments, the inner volume is between 3.0 and 4.0%-$\mu m^2$.

Preferably, the outer profile volume of the relative refractive index profile is greater than 5.0%%-$\mu m^2$, preferably greater than 6.0%-$\mu m$. In some preferred embodiments, the inner profile volume is between 6.1 and 7.5%-$\mu m^2$.

Preferably, the volume ratio of the inner profile volume divided by the outer profile volume is between 0.40 and 0.60.

The optical fiber preferably has a central region with $\Delta_{1MAX}>0.6\%$, more preferably between 0.6 and 0.8%. In some preferred embodiments, $\Delta_{1MAX}$ is between 0.6 and 0.7%. In other preferred embodiments, $\Delta_{1MAX}$ is between 0.7 and 0.8%.

Preferably, the central region extends to a radius between 3 and 5 $\mu m$.

The optical fiber preferably has an annular ring region, surrounding the central region, with $\Delta_{3MAX}<0.15\%$, more preferably between 0.05% and 0.15%, and even more preferably between 0.1% and 0.15%.

Preferably, the annular ring region has a midpoint located between 6.5 and 8.5 $\mu m$. In preferred embodiments, the midpoint is located between 7.0 and 8.0 $\mu m$.

Preferably, the annular ring region has a width between 2 and 8 $\mu m$, more preferably between 3 and 7 $\mu m$.

The core ends and the outer annular cladding region begins at $R_3$, wherein $R_3$ is preferably 8 $\mu m$ or more, and more preferably between 8 and 12 $\mu m$.

The dispersion at 1550 nm is greater than 3 ps/nm-km, preferably greater than 4 ps/nm-km.

In preferred embodiments, the optical fiber has an entirely non-negative relative refractive index profile. In preferred embodiments, the core has an entirely positive relative refractive index profile.

Preferably the optical fiber described and disclosed herein allows suitable performance at a plurality of operating wavelength windows between about 1260 nm and about 1650 nm. More preferably, the optical fiber described and disclosed herein allows suitable performance at a plurality of wavelengths from about 1260 nm to about 1650 nm. In a preferred embodiment, the optical fiber described and disclosed herein is a dual window fiber which can accommodate operation in at least the 1310 nm window and the 1550 nm window.

Reference will now be made in detail to the present preferred embodiments of the invention, examples of which are illustrated in the accompanying drawings.

DETAILED DESCRIPTION OF THE PREFERRED EMBODIMENT

Figure 1:
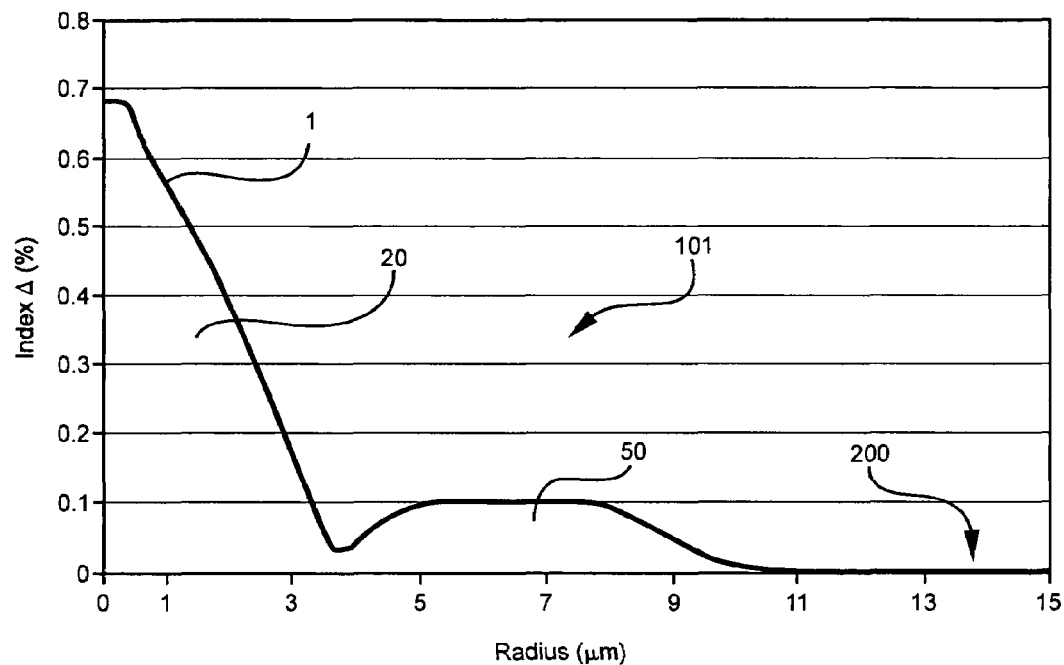
FIG. 1 shows a refractive index profile corresponding to a first set of preferred embodiments of an optical waveguide fiber as disclosed herein.
Figure 2:
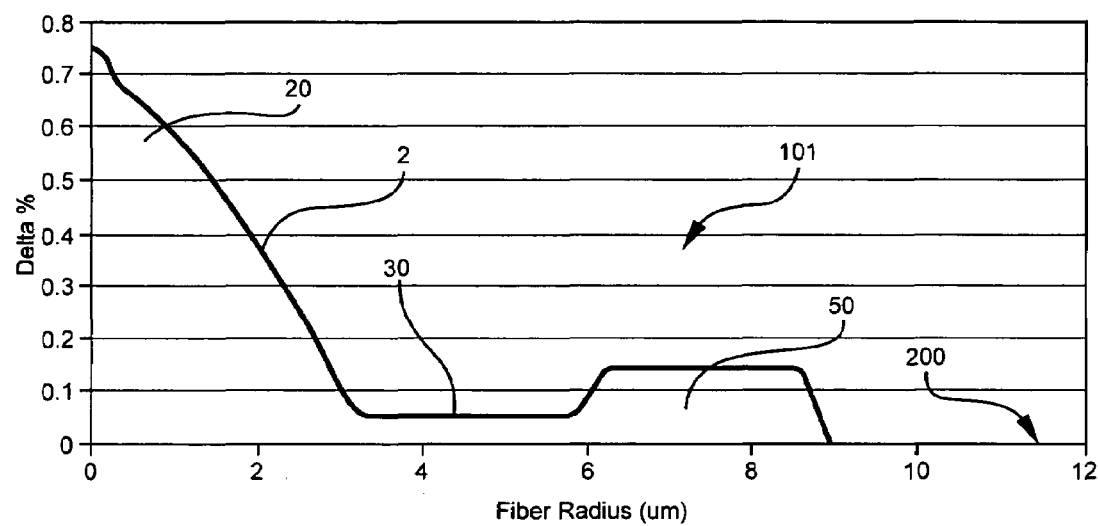
FIGS. 2–5 show refractive index profiles corresponding to a second set of preferred embodiments of an optical waveguide fiber as disclosed herein.
Figure 3:
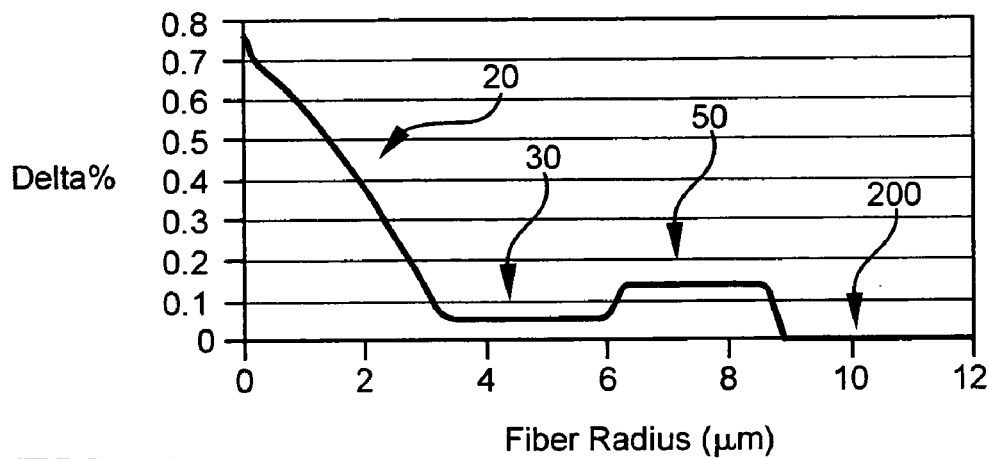
Figure 4:
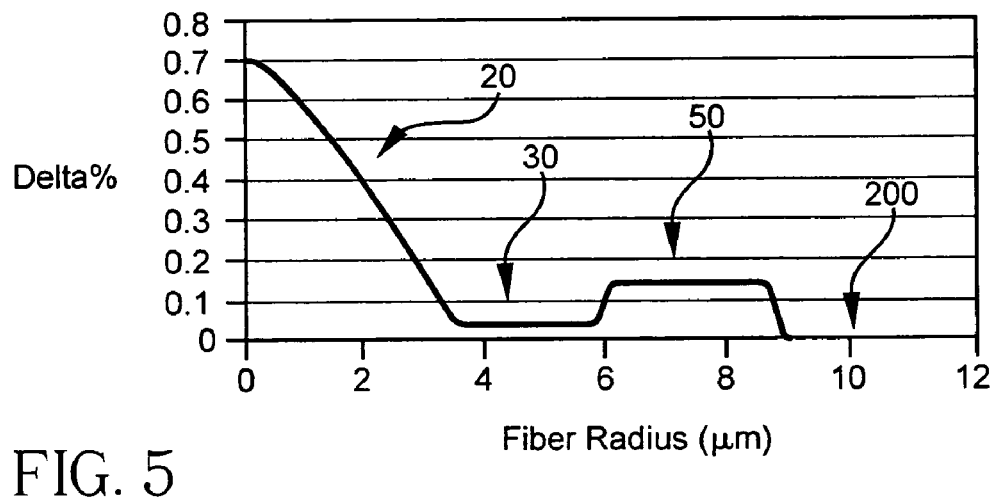
Figure 5:
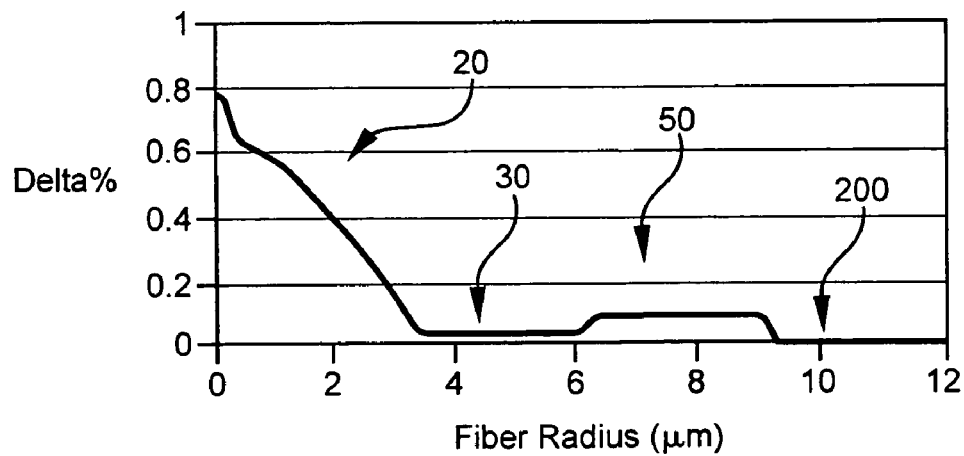

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $A\% = 100 \times (n(r)^2 - n_c^2)/2n(r)^2$ where $n_i$ is the maximum refractive index in region i, unless otherwise specified, and nc is the average refractive index of the cladding region. As used herein, the relative refractive index is represented by A and its values are given in units of "%", unless otherwise specified. In cases where the refractive index of a region is less than the average refractive index of the cladding region, the relative index percent is negative and is referred to as having a depressed region or depressed index, and is calculated at the point at which the relative index is most negative unless otherwise specified. In cases where the refractive index of a region is greater than the average refractive index of the cladding region, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Zero dispersion wavelength is a wavelength at which the dispersion has a value of zero. Dispersion slope is the rate of change of dispersion with respect to wavelength.

"Effective area" is defined as:

$$A_{eff} = 2\pi(\int f^2 \, r \, dr)^2/(\int f^4 \, r \, dr),$$

where the integration limits are 0 to $\infty$, and f is the transverse component of the electric field associated with light propagated in the waveguide. As used herein, "effective area" or "$A_{eff}$" refers to optical effective area at a wavelength of 1550 nm unless otherwise noted.

The term "α-profile" refers to a relative refractive index profile, expressed in terms of $\Delta(r)$ which is in units of "%", where r is radius, which follows the equation, $$A(r) = \Delta(r_o)(1 - [|r - r_o|/(r_1 - r_o)]^\alpha),$$

where $r_o$ is the point at which $\Delta(r)$ is maximum, $r_1$ is the point at which $\Delta(r)\%$ is zero, and r is in the range $r_i \leq r \leq r_f$, where A is defined above, $r_i$ is the initial point of the a-profile, $r_f$ is the final point of the α-profile, and α is an exponent which is a real number.

The mode field diameter (MFD) is measured using the Peterman II method wherein, $2w = MFD$, and $w^2 = (2\int f^2 \, r \, dr/\int [df/dr]^2 \, r \, dr)$, the integral limits being 0 to $\infty$.

The bend resistance of a waveguide fiber can be gauged by induced attenuation under prescribed test conditions.

One type of bend test is the lateral load microbend test. In this so-called "lateral load" test, a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied to the plates and the increase in attenuation in dB/m is measured. The increase in attenuation is the lateral load attenuation of the waveguide.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39–44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The effective fiber cutoff is lower than the theoretical cutoff due to losses that are induced by bending and/or mechanical pressure. In this context, the cutoff refers to the higher of the LP11 and LP02 modes. LP11 and LP02 are generally not distinguished in measurements, but both are evident as steps in the spectral measurement, i.e. no power is observed in the mode at wavelengths longer than the measured cutoff. The actual fiber cutoff can be measured by the standard 2 m fiber cutoff test, FOTP-80 (EIA-TIA-455–80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cabled cutoff" is even lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP's. Cabled cutoff measurement is described in EIA-455–170 Cable Cutoff Wavelength of Single-mode Fiber by Transmitted Power, or "FOTP-170".

The "crossover radius" is determined from a power distribution of an optical fiber, wherein signal power is plotted versus radial distance from the centerline in the fiber for a plurality of wavelengths, and wherein signal power nearest the centerline is lower for lower wavelengths and signal power away from the centerline is higher for lower wavelengths, and the signal power is wavelength independent at the crossover radius. At the crossover radius, the power is the same for all wavelengths.

The "inner profile volume", or "inner volume", is defined as $2\int\Delta\%\, r\, dr$ from r=0 to r=crossover radius, in units of %-µm$^2$.

The "outer profile volume", or "outer volume", is defined as $2\int\Delta\%\, r\, dr$ from r=crossover radius to r=$R_{CORE}$, in units of %-µm$^2$.

The "profile volume ratio", or "volume ratio", is the ratio of the inner profile volume divided by the outer profile volume.

The "ring profile volume", or "ring volume", is defined as $2\int\Delta\%\, r\, dr$ from the radius at which an annular ring region begins to the radius at which the annular ring region ends, in units of %-µm$^2$.

The product of the ring volume and the power ("Ring Volume*Power") is defined as $2\int P(r)^*\Delta\%(r)\, r\, dr$ from the radius at which an annular ring region begins to the radius at which the annular ring region ends, in units of %µ$^2$-W.

Unless otherwise noted herein, optical properties (such as dispersion, dispersion slope, etc.) are reported for the LP01 mode.

A waveguide fiber telecommunications link, or simply a link, is made up of a transmitter of light signals, a receiver of light signals, and a length of waveguide fiber or fibers having respective ends optically connected to the transmitter and receiver to propagate light signals therebetween. The length of waveguide fiber can be made up of a plurality of shorter lengths that are spliced or connected together in end to end series arrangement. A link can include additional optical components such as optical amplifiers, optical attenuators, optical isolators, optical switches, optical filters, or multiplexing or demultiplexing devices. One may denote a group of inter-connected links as a telecommunications system.

A span of optical fiber as used herein includes a length of optical fiber, or a plurality of optical fibers fused together serially, extending between optical devices, for example between two optical amplifiers, or between a multiplexing device and an optical amplifier. A span may comprise one or more sections of optical fiber as disclosed herein, and may further comprise one or more sections of other optical fiber, for example as selected to achieve a desired system performance or parameter such as residual dispersion at the end of a span.

Various wavelength bands, or operating wavelength ranges, or wavelength windows, can be defined as follows: "1310 nm band" is 1260 to 1360 nm; "E-band" is 1360 to 1460 nm; "S-band" is 1460 to 1530 nm; "C-band" is 1530 to 1565 nm; "L-band" is 1565 to 1625 nm; and "U-band" is 1625 to 1675 nm.

The optical fiber disclosed herein comprises a core and a cladding layer (or cladding) surrounding and directly adjacent the core. The cladding has a refractive index profile, $\Delta_{CLAD}(r)$. Preferably, $\Delta_{CLAD}(r)=0$ throughout the cladding. The core comprises a refractive index profile, $\Delta_{CORE}(r)$. In preferred embodiments, the core is comprised of a plurality of core portions, each having respective refractive index profiles, for example $\Delta_{CORE1}(r)$, $\Delta_{CORE2}(r)$, and so on.

Preferably, the core is comprised of silica doped with germanium, i.e. germania doped silica. Dopants other than germanium, singly or in combination, may be employed within the core, and particularly at or near the centerline, of the optical fiber disclosed herein to obtain the desired refractive index and density. In preferred embodiments, the core of the optical fiber disclosed herein has a non-negative refractive index profile, more preferably a positive refractive index profile, wherein the core is surrounded by and directly adjacent to a cladding layer.

Preferably, the refractive index profile of the optical fiber disclosed herein is non-negative from the centerline to the outer radius of the core, $R_{CORE}$. In some preferred embodiments, the optical fiber contains no index-decreasing dopants in the core.

The optical fiber has a central region surrounded by an annular ring region. In some preferred embodiments, an annular moat region is disposed between the central region and the annular ring region. An outermost cladding layer surrounds, and is preferably directly adjacent to the annular ring region. The central region has $\Delta_{1MAX}>0.6\%$, more preferably between 0.6 and 0.8%. In some preferred embodiments, $\Delta_{1MAX}$ is between 0.6 and 0.7%. In other preferred embodiments, $\Delta_{1MAX}$ is between 0.7 and 0.8%. Preferably, the central region extends to a radius between 3 and 5 m. The annular ring region has $\Delta_{3MAX}<0.15\%$, more preferably between 0.05% and 0.15%, and even more preferably between 0.1% and 0.15%. Preferably, the annular ring region has a midpoint $R_{3MID}$ located between 6.5 and 8.5 µm. In preferred embodiments, the midpoint is located between 7.0 and 8.0 µm. Preferably, the annular ring region has a width $W_3$ between 2 and 8 µm, more preferably between 3 and 7 µm. Preferably, the core ends and the outermost annular cladding region begins at least 8 µm, more preferably between 8 and 12 µm.

In a first set of preferred embodiments, and referring to FIG. 1, optical waveguide fibers are disclosed herein which comprise: a central region extending radially outwardly from the centerline to a central region outer radius, $R_1$, and having a relative refractive index percent, $\Delta_1\%(r)$ with a maximum relative refractive index percent, $\Delta_{1MAX}$; an annular ring region (or ring) 50 surrounding the central region 20 and directly adjacent thereto, having a width $W_3$ disposed at a midpoint $R_{3MID}$, and having a positive relative refractive index percent, $\Delta_3\%(r)>0$, with a maximum relative refractive index percent, $\Delta_{3MAX}$, wherein $\Delta_{1MAX}>\Delta_{3MAX}>0$; and an outer annular cladding region 200 surrounding the annular ring region 50 and preferably directly adjacent thereto and having a relative refractive index percent, $\Delta c\%(r)$. The central region also has a minimum relative refractive index, $\Delta_{1MIN}$, wherein $\Delta_{1MAX} > \Delta_{3MAX} > \Delta_{1MIN}$, and $\Delta_{1MIN} > 0$. The core ends, and the cladding begins, at a radius $R_{CORE}$.

In a second set of preferred embodiments, and referring to FIGS. 2–5, optical waveguide fibers are disclosed herein which comprise: a central region extending radially outwardly from the centerline to a central region outer radius, $R_1$, and having a relative refractive index percent, $\Delta_1\%$ (r) with a maximum relative refractive index percent, $\Delta_{1MAX}$; an annular moat region (or moat) 30 surrounding the central region 20 and directly adjacent thereto, extending radially outwardly to a first annular region outer radius, $R_2$, having a width $W_2$ disposed at a midpoint $R_{2MID}$, and having a non-negative relative refractive index percent, $\Delta_2\%$ (r) with a minimum relative refractive index percent, $\Delta_{2MIN}$, where $\Delta_2\%$ (r) $\geq 0$; an annular ring region (or ring) 50 surrounding the annular moat region 30 and preferably directly adjacent thereto, having a width $W_3$ disposed at a midpoint $R_{3MID}$, and having a positive relative refractive index percent, $\Delta_3\%$ (r) > 0, with a maximum relative refractive index percent, $\Delta_{3MAX}$, wherein $\Delta_{1MAX} > \Delta_{3MAX} > \Delta_{2MIN} > 0$; and an outer annular cladding region 200 surrounding the annular ring region 50 and preferably directly adjacent thereto and having a relative refractive index percent, $\Delta_3\%$ (r). The first annular region also has a maximum relative refractive index, $\Delta_{2MAX}$, wherein $\Delta_{1MAX} > \Delta_{3MAX} > \Delta_{2MAX}$ and preferably $\Delta_{2MAX} > 0$. The core ends, and the cladding begins, at a radius $R_{CORE}$.

$\Delta_{1MAX}$ is shown in the Figures as occurring at the centerline (r=0). In some preferred embodiments of the first and second sets of embodiments, the core may comprise a relative refractive index profile having a so-called centerline dip, at or near the centerline in the central region, which may occur as a result of one or more optical fiber manufacturing techniques. The centerline dip has a lower relative refractive index value than $\Delta_{1MAX}$, that is, $\Delta_{1MAX}$ does not occur exactly at r=0. However, the centerline dip in any of the refractive index profiles disclosed herein is optional.

1st Set of Preferred Embodiments

Tables 1–2 list Example 1 which is illustrative of the first set of preferred embodiments. FIG. 1 shows the corresponding refractive index profile of Example 1 in curve 1.

TABLE 1

| Example | | 1 |
|---|---|---|
| $\Delta_{1MAX}$ | % | 0.68 |
| $R_1$ | μm | 4 |
| $R_{1QH}$ | μm | 3.1 |
| $\alpha_1$ | | 1.2 |
| $\Delta_{1MIN}$ | % | 0.04 |
| $\Delta_{3MAX}$ | % | 0.11 |
| $R_{3HHi}$ | μm | 4.2 |
| $R_{3HHj}$ | μm | 8.9 |
| HHPW3 | μm | 4.7 |
| $R_{3HHMID}$ | μm | 6.6 |
| $R_3 = R_{CORE}$ | μm | 10.7 |
| $W_3$ | μm | 6.95 |
| $R_{3MID}$ | μm | 7.2 |
| Inner Volume | %-μm² | 3.35 |
| Outer Volume | %-μm² | 7.19 |
| Volume Ratio | — | 0.47 |
| Ring Volume * Power | %-μm²-W | 0.053 |

TABLE 2

| Example | | 1 |
|---|---|---|
| Dispersion @ 1310 nm | ps/nm-km | −13.6 |
| Dispersion @ 1530 nm | ps/nm-km | 5.2 |
| Dispersion @ 1550 nm | ps/nm-km | 6.8 |
| Dispersion @ 1565 nm | ps/nm-km | 7.9 |
| Dispersion @ 1625 nm | ps/nm-km | 12.5 |
| Slope @ 1550 nm | ps/nm²-km | 0.078 |
| Kappa @ 1550 nm | nm | 87 |
| Lambda Zero | nm | 1471 |
| MFD @ 1550 nm | um | 9.92 |
| Aeff @ 1550 nm | μm² | 72 |
| Pin Array @ 1550 nm | dB | 9.8 |
| Lateral Load @ 1550 nm | dB/m | 0.7 |
| Attenuation @ 1550 nm | dB/km | 0.193 |
| LP11 | nm | 1539 |
| LP02 | nm | 1448 |
| Cable Cutoff | nm | 1104 |

Referring to FIG. 1, an optical waveguide fiber 100 disclosed herein preferably comprises: a central region extending radially outwardly from the centerline to a central region outer radius, $R_1$, and having a relative refractive index percent, $\Delta_1\%$(r) with a maximum relative refractive index percent, $\Delta_{1MAX}$; an annular ring region (or ring) 50 surrounding the central region 20 and directly adjacent thereto, extending radially outwardly to an annular ring region outer radius $R_3$, the annular ring region 50 having a width $W_3$ disposed at a midpoint $R_{3MID}$, and having a positive relative refractive index percent, $\Delta_3\%$ (r) > 0, with a maximum relative refractive index percent, $\Delta_{3MAX}$, wherein $\Delta_{1MAX} > \Delta_{3MAX} > 0$; and an outer annular cladding region 200 surrounding the second annular region 50 and preferably adjacent thereto and having a relative refractive index percent, $\Delta_c \%$ (r). The core ends and the cladding begins at a radius $R_{CORE}$.

The end of central core region 20, $R_1$, in this set of embodiments is the beginning of annular ring region 50 and is defined herein to start at a radius where a straight line approximation, indicated by line 21 which passes tangentially through the quarter-peak height of the central region 20 is extrapolated to intersect with the $\Delta$ %=0 axis at $R_{1QH}$.

The optical fiber has a local minimum relative refractive index disposed between the central region and the annular ring region. In FIG. 1, the local minimum relative refractive index is $\Delta_{1MIN}$, wherein $\Delta_{1MAX} > \Delta_{3MAX} > \Delta_{1MIN}$, and $\Delta_{1MIN} > 0$. The central region, as illustrated by the embodiment shown in FIG. 1, may optionally comprise a relatively flat centermost portion extending radially outwardly from the centerline to a radius, $R_4$, <1 μm, the central region further comprising a second portion surrounding and preferably directly adjacent to the first portion, the second portion extending from about r=1 μm to r=3 μm and having an alpha profile, wherein an $\alpha_1$ of 1.2 is shown in FIG. 1. In this set of preferred embodiments, the annular ring region 50 is defined to begin where the central region 20 ends, and the annular ring region 50 is defined to end at a radius which is greater than $R_{3MID}$ and where $\Delta_3\%$ (r) is less than 0.01%, at $R_3$.

Thus, the optical fiber 100 in this set of embodiments preferably comprises two core segments: central core region 20 and second annular core region 50. The ring 50 extends from $R_1$ to the ring outer radius $R_3$. The ring width $W_3$ is defined as the radial distance between $R_1$ and $R_3$. The ring 50 has a positive relative refractive index profile with a "peak" or a maximum relative refractive index percent, $\Delta_{3MAX}$. $R_{3HHi}$ marks the first radially inward, or centermost, occurrence of the half-height of $\Delta_{3MAX}$. $R_{3HHj}$ marks the first radially outward occurrence of the half-height of $\Delta_{3MAx}$. The ring half-height peak width HHPW$_3$ is bounded by inner and outer radii, $R_{3HHi}$ and $R_{3HHj}$, respectively. The midpoint of the ring half-height peak width HHPW$_3$ occurs at a radius $R_{3HHmid}$ which is half the radial distance between $R_{3HHi}$ and $R_{3HHmid}$. Preferably, $\Delta_{3MAX}$ occurs at $R_{3HHMID}$. Preferably, $R_{3HHMID}$ coincides with the middle of the ring 50, $R_{3MID}$.

Preferably, $\Delta\%$ (r) is greater than or equal to 0% for radii up to 15 μm, more preferably up to 30 μm, and even more preferably for all radii, i.e. from r=0 at the centerline to r=Rmax, where Rmax is the outermost radius of the silica-based part of the optical fiber (excluding any coating).

The optical fiber in this set of embodiments has an effective area at 1550 nm greater than 65 μm$^2$, preferably greater than 70 μm$^2$. The dispersion at 1550 nm is greater than 5 ps/nm-km, preferably between 5 and 10 ps/nm-km. The dispersion slope is less than 0.09 ps/nm$^2$-km, preferably less than 0.085 ps/nm$^2$-km, more preferably less than 0.08 ps/nm$^2$-km. The cabled cutoff is less than 1250 nm, preferably less than 1200 nm. The attenuation at 1550 nm is less than 0.200 dB/km, preferably less than 0.195 dB/km. The pin array bending loss is less than 15 dB, preferably less than 10 dB. The zero dispersion wavelength is less than 1500 nm, preferably between 1350 and 1500 nm. The absolute magnitude of the dispersion at 1310 nm is preferably less than 15 ps/nm-km. In preferred embodiments, the ratio of the dispersion divided by the dispersion slope, or kappa, is between 50 and 100 nm.

Optical fibers in this first set of preferred embodiments have an effective area and dispersion which minimize the propagation of nonlinearities and phase modulation, particularly in higher bit rate optical communication systems, for example those operating at 25 GHz and above.

Central region 20 comprises a maximum relative refractive index or peak $\Delta_1$ %, $\Delta_{1MAX}$, between 0.6 and 0.8%, more preferably between 0.65 and 0.75%, and a radius $R_1$ of between about 2 and 6 μm, more preferably between about 3 and 5 μm, as defined by a straight line approximation wherein a straight line passes tangentially through the quarter-peak height of the central region 20 and is extrapolated to intersect with the $\Delta$ %=0 axis at $R_{1QH}$. Preferably, the quarter-peak height occurs at a radius between about 2 μm and about 4 μm. The annular ring region 50 begins at $R_1$. Annular ring region 50 has a maximum relative refractive index or peak $\Delta_3$%, $\Delta_{3MAX}$, of between about 0.05% and 0.15%. The outer annular cladding region or cladding segment 200 is preferably disposed directly adjacent and surrounding second annular core segment 50. $\Delta_{3MAX}$ is preferably less than 0.3 $\Delta_{1MAX}$, more preferably less than 0.2 $\Delta_{1MAX}$. Preferably, the ring has a width $W_3$ of between 6 and 8 μm, more preferably between 6.5 and 7.5 μm. Preferably, the ring has a midpoint $R_{3MID}$ between 6 and 8 1 m. Preferably the half-height peak width of the ring HHPW3 is greater than 2.5 μm, preferably greater than 3 μm, and in some preferred embodiments greater than 4 μm, and the half height midpoint of the ring $R_{3MID}$ is greater than 5 μm, preferably greater than 6 μm, and in some preferred embodiments between 6 and 7 μm.

The inner profile volume of the relative refractive index profile is greater than 2.0%-μm$^2$, preferably greater than 2.5%-μm$^2$, and more preferably greater than 3.0%%-μm$^2$. In some preferred embodiments, the inner volume is between 3.0 and 4.0%-μm$^2$.

Preferably, the outer profile volume of the relative refractive index profile is greater than 5.0%-μm$^2$, preferably greater than 6.0%-μm$^2$. In some preferred embodiments, the inner profile volume is between 6.1 and 7.5%-μm$^2$.

Preferably, the volume ratio of the inner profile volume divided by the outer profile volume is between 0.40 and 0.60.

In some preferred embodiments, the inner volume is greater than 3.0%-μm$^2$ and the outer volume is greater than 6.0%-μm$^2$.

In preferred embodiments, the inner profile volume is between 3.0 and 4.0%-μm$^2$, the outer profile volume is between 6.5 and 7.5%-μm$^2$, and the volume ratio of the inner profile volume divided by the outer profile volume is between 0.42 and 0.52.

The product of the ring volume and the power in the optical fiber is less than 0.040%-μm$^2$-W, preferably less than 0.035%-μm$^2$-W.

2$^{nd}$ Set of Preferred Embodiments

FIGS. 2–5 show relative refractive index profiles of Examples 2–5, labeled curves 2–5, respectively, which are illustrative of a second set of preferred embodiments. Tables 3 and 4 list characteristics of Examples 2–5.

TABLE 3

| Example | | 2 | 3 | 4 | 5 |
|---|---|---|---|---|---|
| $\Delta_{1MAX}$ | % | 0.77 | 0.77 | 0.70 | 0.79 |
| $R_1$ | μm | 3.6 | 3.6 | 3.7 | 3.6 |
| $R_{1QH}$ | μm | 2.7 | 2.8 | 2.9 | 2.8 |
| $\alpha_1$ | | 1.4 | 1.4 | 1.2 | 1.5 |
| $\Delta_{2MAX}$ | % | 0.05 | 0.05 | 0.04 | 0.044 |
| $\Delta_{2MIN}$ | % | 0.05 | 0.05 | 0.04 | 0.044 |
| $R_2$ | μm | 5.7 | 5.8 | 5.6 | 5.9 |
| $W_2$ | μm | 2.1 | 2.2 | 1.9 | 2.3 |
| $R_{2MID}$ | μm | 4.7 | 4.7 | 4.65 | 4.8 |
| $\Delta_{3MAX}$ | % | 0.14 | 0.14 | 0.14 | 0.10 |
| $R_{3HHi}$ | μm | 6 | 6.1 | 5.9 | 6.1 |
| $R_{3HHJ}$ | μm | 8.8 | 8.8 | 8.7 | 9.2 |
| HHPW3 | μm | 2.8 | 2.7 | 2.8 | 3.1 |
| $R_{3HHMID}$ | μm | 7.4 | 7.5 | 7.3 | 7.7 |
| $R_3 = R_{CORE}$ | μm | 8.9 | 9 | 8.9 | 9.4 |
| $W_3$ | μm | 3.2 | 3.2 | 3.3 | 3.5 |
| $R_{3MID}$ | μm | 7.3 | 7.4 | 7.25 | 7.65 |
| Inner Volume | %-μm$^2$ | 23.33 | 3.31 | 3.36 | 3.40 |
| Outer Volume | %-μm$^2$ | 7.27 | 7.12 | 7.06 | 6.16 |
| Volume Ratio | — | 0.46 | 0.47 | 0.48 | 0.55 |
| Ring Volume* Power | %-μm$^2$-W | 0.029 | 0.027 | 0.030 | 0.017 |

TABLE 4

| Example | | 2 | 3 | 4 | 5 |
|---|---|---|---|---|---|
| Dispersion @ 1310 nm | ps/nm-km | −16.3 | −16.0 | −15.5 | −14.0 |
| Dispersion @ 1530 nm | ps/nm-km | 2.55 | 2.65 | 2.8 | 3.1 |
| Dispersion @ 1550 nm | ps/nm-km | 41.2 | 4.3 | 4.4 | 4.6 |
| Dispersion @ 1565 nm | ps/nm-km | 5.4 | 5.5 | 5.6 | 5.7 |
| Dispersion @ 1625 nm | ps/nm-km | 10.3 | 10.3 | 10.4 | 10.1 |
| Slope @ 1550 nm | ps/nm$^2$-km | 0.082 | 0.081 | 0.080 | 0.074 |
| Kappa | nm | 51 | 53 | 55 | 62 |
| Lambda Zero | nm | 1499 | 1497 | 1495 | 1487 |
| MFD @ 1550 nm | um | 9.69 | 9.69 | 9.69 | 9.43 |
| Aeff @ 1550 nm | um$^2$ | 70.2 | 70.1 | 70.2 | 65.9 |
| PinArray @ 1550 nm | dB | 10.9 | 11.7 | 11.7 | 12.3 |
| Lateral Load @ 1550 nm | dB/m | 0.7 | 0.7 | 0.7 | 0.6 |
| Attenuation @ 1550 nm | dB/km | 0.195 | 0.195 | 0.195 | 0.194 |
| Attenuation @ 1310 nm | dB/km | 0.345 | 0.345 | 0.344 | 0.344 |
| LP11 | nm | 1599 | 1582 | 1587 | 1474 |
| Cable Cutoff | nm | 1194 | 1186 | 1188 | 1137 |

Referring to FIGS. 2–5, an optical waveguide fiber 100 disclosed herein preferably comprises: a central region extending radially outwardly from the centerline to a central region outer radius, $R_1$, and having a relative refractive index percent, $\Delta_1\%$ (r) with a maximum relative refractive index percent, $\Delta_{1MAX}$; an annular moat region (or moat) 30 surrounding the central region 20 and directly adjacent thereto, extending radially outwardly to an annular moat region outer radius, $R_2$, having a width $W_2$ disposed at a midpoint $R_{2MID}$, and having a non-negative relative refractive index percent, $\Delta_2\%$ (r) with a minimum relative refractive index percent, $\Delta_{2MIN}$, and a maximum relative refractive index percent, $\Delta_{2MAX}$, where $\Delta_2\%$ (r)$\geq$0; an annular ring region (or ring) 50 surrounding the annular moat region 30 and preferably directly adjacent thereto, having a width $W_3$ disposed at a midpoint $R_{3MID}$, and having a positive relative refractive index percent, $\Delta_3\%$ (r)>0, with a maximum relative refractive index percent, $\Delta_{3MAX}$, wherein $\Delta_{1MAX} > \Delta_{3MAX} > \Delta_{2MAX} > \Delta_{2MIN} > 0$; and an outer annular cladding region 200 surrounding the annular ring region 50 and preferably adjacent thereto and having a relative refractive index percent, $\Delta_c\%$ (r). The annular ring region 50 is defined herein to end at a radius where $\Delta_3\%$ (r) is less than 0.01%, at $R_3$. The core ends and the cladding begins at a radius $R_{CORE}$. Preferably, $R_{CORE} = R_3$.

The end of central core region 20, $R_1$, which in this set of embodiments is also the beginning of annular moat region 30, is defined herein to start at a radius where a straight line approximation which passes tangentially through the quarter-peak height of the central region 20 at $R_{1QH}$ is extrapolated to intersect with the $\Delta\% = 0$ axis.

Thus, the optical fiber 100 preferably comprises three core segments: central region 20, annular moat region 30, and annular ring region 50. In preferred embodiments, the central region 20 includes a portion extending from about r=1 to r=3 and generally has an alpha profile shape with an alpha1 preferably between 1 and 2. the annular moat region 30 extends from the $R_1$ to the outer radius $R_2$. The width $W_2$ is defined as the radial distance between $R_1$ and $R_2$. The midpoint $R_{2MID}$ occurs in the middle of $R_1$ and $R_2$. The ring 50 extends from $R_2$ to the ring outer radius $R_3$. The ring width $W_3$ is defined as the radial distance between $R_2$ and $R_3$. The ring 50 has a positive relative refractive index profile with a "peak" or a maximum relative refractive index percent, $\Delta_{3MAX}$. $R_{3HHi}$ marks the first radially inward, or centermost, occurrence of the half-height of $\Delta_{3MAX}$. $R_{3HHj}$ marks the first radially outward occurrence of the half-height of $\Delta_{3MAX}$. The ring half-height peak width HHPW$_3$ is bounded by inner and outer radii, $R_{3HHi}$ and $R_{3HHj}$, respectively. The midpoint of the ring half-height peak width HHPW$_3$ occurs at a radius $R_{3HHmid}$ which is half the radial distance between $R_{3HHi}$ and $R_{3HHj}$. Preferably, $\Delta_{3MAX}$ occurs at $R_{3HHMID}$. Preferably, $R_{3HHMID}$ coincides with the middle of the ring 50, $R_{3MID}$, between $R_2$ and $R_3$.

The optical fiber in this set of embodiments has an effective area at 1550 nm greater than 65 $\mu m^2$, preferably greater than 70 $\mu m^2$. The dispersion at 1550 nm is greater than 3.5 ps/nm-km, preferably greater than 4.0 ps/nm-km, and in some preferred embodiments between 4.0 and 7.0 ps/nm-km. The dispersion slope is less than 0.090 ps/nm$^2$-km, preferably less than 0.085 ps/nm$^2$-km, and in some preferred embodiments less than 0.08 ps/nm$^2$-km. The cabled cutoff is less than 1250 nm, preferably less than 1200 nm, and in some preferred embodiments between 1100 and 1200 nm. The attenuation at 1550 nm is less than 0.200 dB/km, preferably less than 0.195 dB/km. The pin array bending loss is less than 15 dB, preferably less than 10 dB. The zero dispersion wavelength is less than 1500 nm, preferably between 1350 and 1500 nm, and in some preferred embodiments between about 1450 and 1500 nm. The absolute magnitude of the dispersion at 1310 nm is preferably less than 17 ps/nm-km.

Preferably, $\Delta\%$ (r) is greater than or equal to 0% for radii up to 15 $\mu$m, more preferably up to 30 $\mu$m, and even more preferably for all radii, i.e. from r=0 at the centerline to r=Rmax, where Rmax is the outermost radius of the silica-based part of the optical fiber (excluding any coating).

Central region 20 comprises a maximum relative refractive index or peak $\Delta_1\%$, $\Delta_{1MAX}$, between 0.6 and 0.8%, more preferably between 0.70 and 0.80%, and a radius $R_1$ of between about 2 and 6 $\mu$m, more preferably between about 3 and 5 $\mu$m, and even more preferably between 4 and 5 $\mu$m, where $R_1$ is defined by a straight line approximation wherein a straight line passes tangentially through the quarter-peak height of the central region 20 at $R_{1QH}$ and is extrapolated to intersect with the $\Delta\% = 0$ axis. Preferably, the quarter-peak height occurs at a radius between about 2 $\mu$m and about 4 $\mu$m. Annular moat region 30 begins at $R_1$ and has a $\Delta_{2MAX} < 0.08\%$, preferably <0.07%, and $\Delta_{2MIN} > 0\%$, preferably >0.02%. Moat 30 ends at $R_2$ where ring 50 begins, and has a width $W_2$ of between about 1 and about 3 $\mu$m, and has a midpoint located at $R_{MID3}$ between about 4 and 6 $\mu$m, preferably between about 4 and 5 $\mu$m.

The end of the annular moat region 30 and the beginning of annular ring region 50 is defined herein to occur for this set of embodiments at a radius where a straight line approximation passes tangentially through the half-peak height (at $R_{3HHi}$) of the centermost side of annular ring region 50 and is extrapolated to intersect with the $\Delta\% = 0$ axis. Annular moat region 30 ends and annular ring region 50 begins between about 5 $\mu$m and about 7 $\mu$m, more preferably between about 5 $\mu$m and about 6 $\mu$m. Annular ring region 50 has a maximum relative refractive index or peak $\Delta_3\%$, $\Delta_{3MAX}$, of between about 0.08% and 0.2%, preferably between about 0.09% and 0.15%. The outer annular cladding region or cladding segment 200 is disposed adjacent and surrounding annular ring segment 50, and preferably begins from a radius of between about 8 $\mu$m and about 15 $\mu$m, more preferably between about 8 $\mu$m and about 12 $\mu$m. $\Delta_{1MAX}$ is greater than $\Delta_{3MAX}$. $\Delta_{3MAX}$ is greater than $\Delta_{2MIN}$, and preferably $\Delta_{3MAX}$ is greater than $\Delta_{2MAX}$. $\Delta_{2MAX}$ is preferably less than 0.1 $\Delta_{3MAX}$. $\Delta_{3MAX}$ is preferably less than 0.3 $\Delta_{1MAX}$, more preferably less than 0.2 $\Delta_{1MAX}$. Preferably, the ring 50 has a width $W_3$ of between 2 and 5 $\mu$m, more preferably between 2 and 4 $\mu$m. Preferably, the ring has a midpoint $R_{3MID}$ between 7 and 8 $\mu$m. Preferably the half-height peak width of the ring HHPW3 is greater than 2.5 $\mu$m, and in some preferred embodiments greater than 3 $\mu$m, and the half height midpoint of the ring $R_{3HHMID}$ is greater than 5 $\mu$m, preferably greater than 6 $\mu$m, more preferably greater than 7 $\mu$m, and in some preferred embodiments between 7 and 8 $\mu$m.

The inner profile volume of the relative refractive index profile is greater than 2.0%-$\mu m^2$, preferably greater than 2.5%-$\mu m^2$, and more preferably greater than 3.0%-$\mu m^2$. In some preferred embodiments, the inner volume is between 3.0 and 4.0%-$\mu m^2$.

Preferably, the outer profile volume of the relative refractive index profile is greater than 5.0%-$\mu m^2$, preferably greater than 6.0%-$\mu m^2$. In some preferred embodiments, the outer profile volume is between 6.1 and 7.5%-$\mu m^2$.

Preferably, the volume ratio of the inner profile volume divided by the outer profile volume is between 0.40 and 0.60.

In some preferred embodiments, the inner volume is greater than 3.0%-μm² and the outer volume is greater than 6.0%-μm².

In preferred embodiments, the inner profile volume is between 3.0 and 4.0%-μm², the outer profile volume is between 6.5 and 7.5%-μm², and the ratio of the inner profile volume divided by the outer profile volume is between 0.42 and 0.52.

Optical fibers in this second set of preferred embodiments have at least three segments, and preferably the product of the ring volume and the power in the optical fiber is less than 0.040%-μm², more preferably less than 0.035%-μm². Applicants believe, without the desire or the necessity to be bound by any theory, that such optical fibers would be less susceptible to undesirable heat aging. The term "heat aging" refers to an attenuation increase exhibited by an optical waveguide that has been exposed to heat or temperature fluctuations. Preferably, the core of the optical fiber has a central region, an annular moat region surrounding and preferably directly adjacent to the central region, and an annular ring region surrounding and preferably directly adjacent to the annular moat region.

Figure 6:
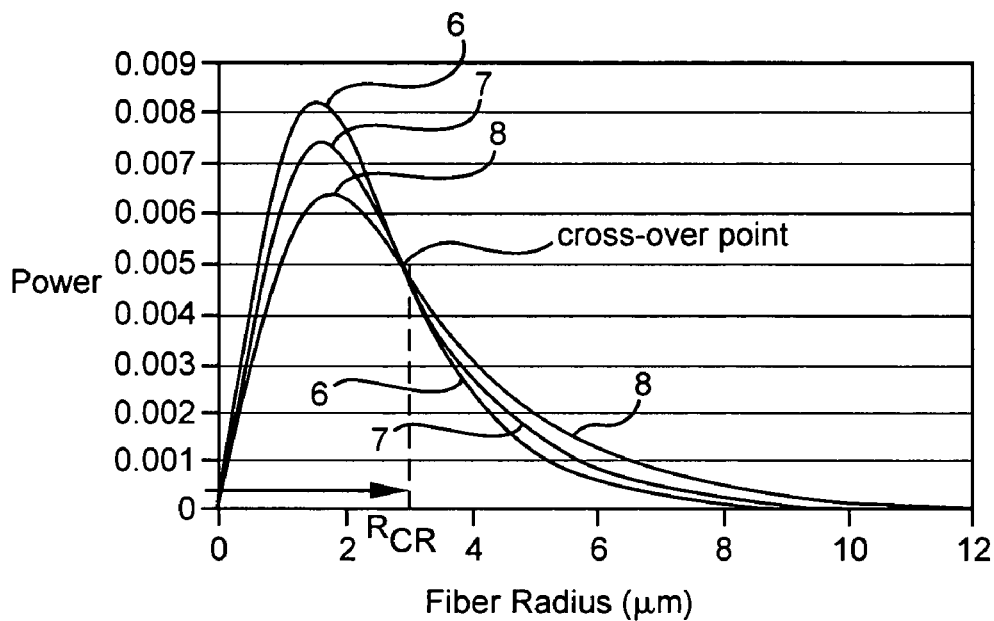
FIG. 6 schematically illustrates a power distribution of a representative optical fiber showing the signal power at various wavelengths plotted versus radial distance, starting from the centerline of the fiber.

FIG. 6 schematically illustrates a power distribution of a representative optical fiber showing the signal power plotted versus radial distance from the centerline of the fiber. Curves 6, 7, and 8 correspond to the signal power at wavelengths of 1310, 1410, and 1550 nm, respectively. At radii closest to the centerline (for example 0 to about 2 microns), the signal power at 1410 nm is greater than the power at 1550 nm, and the signal power at 1310 nm is greater than the power at 1410 nm. At radii more distant from the centerline (for example greater than about 4 microns), the signal power at 1410 nm is less than the power at 1550 nm, and the signal power at 1310 nm is less than the power at 1410 nm. The signal power is wavelength independent at the crossover radius, $R_{CR}$, which is the radius at which the field amplitudes (or powers) at all wavelengths intersect.

Preferably, the optical fiber disclosed herein is capable of transmitting optical signals in the 1260 nm to 1625 nm wavelength range.

Preferably, the fibers disclosed herein are made by a vapor deposition process. Even more preferably, the fibers disclosed herein are made by an outside vapor deposition (OVD) process. Thus, for example, known OVD laydown, consolidation, and draw techniques may be advantageously used to produce the optical waveguide fiber disclosed herein. Other processes, such as modified chemical vapor deposition (MCVD) or vapor axial deposition (VAD) or plasma chemical vapor deposition (PCVD) may be used. Thus, the refractive indices and the cross sectional profile of the optical waveguide fibers disclosed herein can be accomplished using manufacturing techniques known to those skilled in the art including, but in no way limited to, OVD, VAD and MCVD processes.

Figure 7:
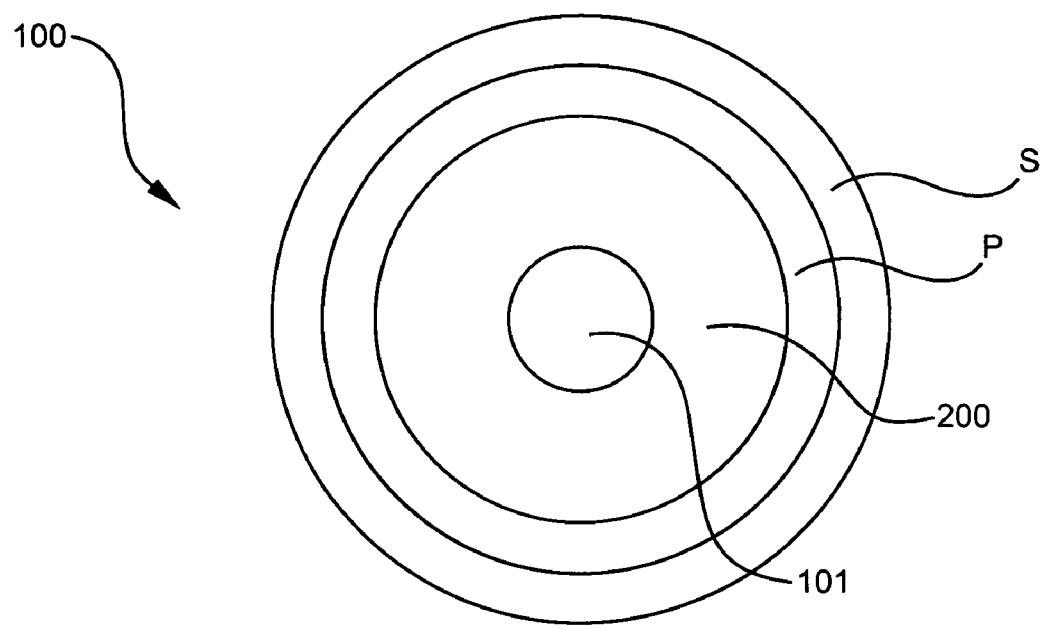
FIG. 7 is a schematic cross-sectional view of a preferred embodiment of an optical waveguide fiber as disclosed herein.

FIG. 7 is a schematic representation (not to scale) of an optical waveguide fiber 100 as disclosed herein having core 101 and an outer annular cladding or outer cladding layer or clad layer 200 directly adjacent and surrounding the core 101.

Preferably, the cladding contains no germania or fluorine dopants therein. More preferably, the cladding 200 of the optical fiber disclosed herein is pure or substantially pure silica. The clad layer 200 may be comprised of a cladding material which was deposited, for example during a laydown process, or which was provided in the form of a jacketing, such as a tube in a rod-in-tube optical preform arrangement, or a combination of deposited material and a jacket. The clad layer 200 may include one or more dopants. The clad layer 200 is surrounded by a primary coating P and a secondary coating S. The refractive index of the cladding 200 is used to calculate the relative refractive index percentage as discussed elsewhere herein.

Referring to the Figures, the clad layer 200 has a refractive index of $n_c$ surrounding the core which is defined to have a $\Delta(r)=0\%$, which is used to calculate the refractive index percentage of the various portions or regions of an optical fiber or optical fiber preform.

Preferably, the optical fiber disclosed herein has a silica-based core and cladding. In preferred embodiments, the cladding has an outer diameter, 2*Rmax, of about 125 μm. Preferably, the outer diameter of the cladding has a constant diameter along the length of the optical fiber. In preferred embodiments, the refractive index of the optical fiber has radial symmetry. Preferably, the outer diameter of the core has a constant diameter along the length of the optical fiber. Preferably, one or more coatings surround and are in contact with the cladding. The coating is preferably a polymer coating such as acrylate. Preferably the coating has a constant diameter, radially and along the length of the fiber.

Figure 8:
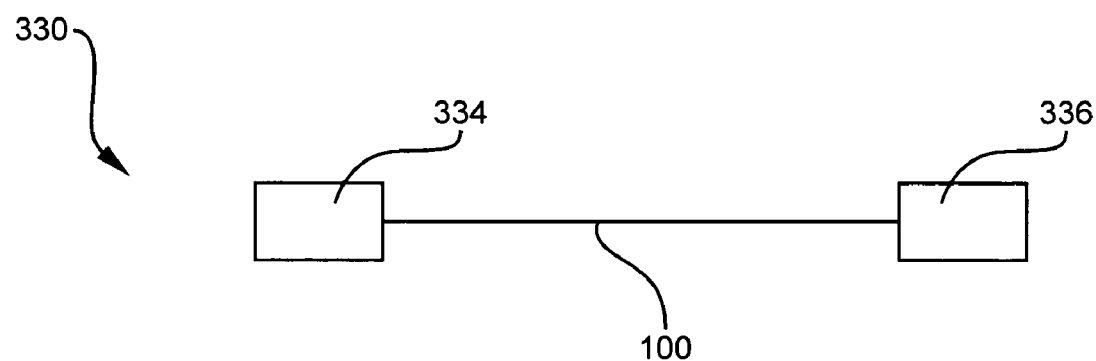
FIG. 8 is a schematic view of a fiber optic communication system employing an optical fiber as disclosed herein.

As shown in FIG. 8, an optical fiber 100 as disclosed herein may be implemented in an optical fiber communication system 330. System 330 includes a transmitter 334 and a receiver 336, wherein optical fiber 100 allows transmission of an optical signal between transmitter 334 and receiver 336. System 330 is preferably capable of 2-way communication, and transmitter 334 and receiver 336 are shown for illustration only. The system 330 preferably includes a link which has a section or a span of optical fiber as disclosed herein. The system 330 may also include one or more optical devices optically connected to one or more sections or spans of optical fiber as disclosed herein, such as one or more regenerators, amplifiers, or dispersion compensating modules. In at least one preferred embodiment, an optical fiber communication system according to the present invention comprises a transmitter and receiver connected by an optical fiber without the presence of a regenerator therebetween. In another preferred embodiment, an optical fiber communication system according to the present invention comprises a transmitter and receiver connected by an optical fiber without the presence of an amplifier therebetween. In yet another preferred embodiment, an optical fiber communication system according to the present invention comprises a transmitter and receiver connected by an optical fiber having neither an amplifier nor a regenerator nor a repeater therebetween.

Preferably, the optical fibers disclosed herein have a low OH ion content, or low water content, particularly in the core, and preferably are low water peak optical fibers, i.e. having an attenuation curve which exhibits a relatively low, or no, water peak in a particular wavelength region, especially in the E-band.

Methods of producing low water peak optical fiber can be found in PCT Application Publication Numbers WO00/64825, WO01/47822, and WO02/051761, the contents of each being hereby incorporated by reference.

A soot preform or soot body is preferably formed by chemically reacting at least some of the constituents of a moving fluid mixture including at least one glass-forming precursor compound in an oxidizing medium to form a silica-based reaction product. At least a portion of this reaction product is directed toward a substrate, to form a porous silica body, at least a portion of which typically includes hydrogen bonded to oxygen. The soot body may be formed, for example, by depositing layers of soot onto a bait rod via an OVD process.

A substrate or bait rod or mandrel is inserted through a glass body such as a hollow or tubular handle and mounted on a lathe. The lathe is designed to rotate and translate the mandrel in close proximity with a soot-generating burner. As the mandrel is rotated and translated, silica-based reaction product, known generally as soot, is directed toward the mandrel. At least a portion of silica-based reaction product is deposited on the mandrel and on a portion of the handle to form a body thereon.

Once the desired quantity of soot has been deposited on the mandrel, soot deposition is terminated and the mandrel is removed from the soot body.

Upon removal of the mandrel, the soot body defines a centerline hole passing axially therethrough. Preferably, the soot body is suspended by a handle on a downfeed device and positioned within a consolidation furnace. The end of the centerline hole remote from the handle is preferably fitted with a bottom plug prior to positioning the soot body within the consolidation furnace. Preferably, the bottom plug is positioned and held in place with respect to the soot body by friction fit. The plug is further preferably tapered to facilitate entry and to allow at least temporary affixing, and at least loosely, within the soot body.

The soot body is preferably chemically dried, for example, by exposing soot body to a chlorine-containing atmosphere at elevated temperature within consolidation furnace. A chlorine-containing atmosphere effectively removes water and other impurities from soot body, which otherwise would have an undesirable effect on the properties of the optical waveguide fiber manufactured from the soot body. In an OVD formed soot body, the chlorine flows sufficiently through the soot to effectively dry the entire preform, including the centerline region surrounding centerline hole.

Following the chemical drying step, the temperature of the furnace is elevated to a temperature sufficient to consolidate the soot blank into a sintered glass preform, preferably about 1500° C. The centerline hole is then closed during the consolidation step so that the centerline hole does not have an opportunity to be rewetted by a hydrogen compound prior to centerline hole closure. Preferably, the centerline region has a weighted average OH content of less than about 1 ppb.

Exposure of the centerline hole to an atmosphere containing a hydrogen compound can thus be significantly reduced or prevented by closing the centerline hole during consolidation.

As described above and elsewhere herein, the plugs are preferably glass bodies having a water content of less than about 31 ppm by weight, such as fused quartz plugs, and preferably less than 5 ppb by weight, such as chemically dried silica plugs. Typically, such plugs are dried in a chlorine-containing atmosphere, but an atmosphere containing other chemical drying agents is equally applicable. Ideally, the glass plugs will have a water content of less than 1 ppb by weight. In addition, the glass plugs are preferably thin walled plugs ranging in thickness from about 200 µm to about 2 mm. Even more preferably, at least a portion of a top plug has a wall thickness of about 0.2 to about 0.5 mm. More preferably still, elongated portion 66 has a wall thickness of about 0.3 mm to about 0.4 mm. Thinner walls promote diffusion, but are more susceptible to breakage during handling.

Thus, inert gas is preferably diffused from the centerline hole after the centerline hole has been sealed to create a passive vacuum within the centerline hole, and thin walled glass plugs can facilitate rapid diffusion of the inert gas from the centerline hole. The thinner the plug, the greater the rate of diffusion. A consolidated glass preform is preferably heated to an elevated temperature which is sufficient to stretch the glass preform, preferably about 1950° C. to about 2100° C., and thereby reduce the diameter of the preform to form a cylindrical glass body, such as a core cane or an optical fiber, wherein the centerline hole collapses to form a solid centerline region. The reduced pressure maintained within the sealed centerline hole created passively during consolidation is generally sufficient to facilitate complete centerline hole closure during the draw (or redraw) process. Consequently, overall lower O–H overtone optical attenuation can be achieved. For example, the water peak at 1383 nm, as well as at other OH induced water peaks, such as at 950 nm or 1240 nm, can be lowered, and even virtually eliminated.

A low water peak generally provides lower attenuation losses, particularly for transmission signals between about 1340 nm and about 1470 µm. Furthermore, a low water peak also affords improved pump efficiency of a pump light emitting device which is optically coupled to the optical fiber, such as a Raman pump or Raman amplifier which may operate at one or more pump wavelengths. Preferably, a Raman amplifier pumps at one or more wavelengths which are about 100 nm lower than any desired operating wavelength or wavelength region. For example, an optical fiber carrying an operating signal at wavelength of around 1550 nm may be pumped with a Raman amplifier at a pump wavelength of around 1450 nm. Thus, the lower fiber attenuation in the wavelength region from about 1400 nm to about 1500 nm would tend to decrease the pump attenuation and increase the pump efficiency, e.g. gain per mW of pump power, especially for pump wavelengths around 1400 nm. Generally, for greater OH impurities in a fiber, the water peak grows in width as well as in height. Therefore, a wider choice of more efficient operation, whether for operating signal wavelengths or amplification with pump wavelengths, is afforded by the smaller water peak. Thus, reducing OH impurities can reduce losses between, for example, for wavelengths between about 1260 nm to about 1650 nm, and in particular reduced losses can be obtained in the 1383 nm water peak region thereby resulting in more efficient system operation. Preferably, optical fiber as disclosed herein has an attenuation at 1380 nm which is no more than 0.3 dB higher than the attenuation at 1310 nm, and more preferably the attenuation at 1380 nm is less than or equal to the attenuation at 1310 nm.

The fibers disclosed herein exhibit low PMD values particularly when fabricated with OVD processes. Spinning of the optical fiber may also lower PMD values for the fiber disclosed herein.

All of the optical fibers disclosed herein can be employed in an optical signal transmission system, which preferably comprises a transmitter, a receiver, and an optical transmission line. The optical transmission line is optically coupled to the transmitter and receiver. The optical transmission line preferably comprises at least one optical fiber span, which preferably comprises at least one section of optical fiber.

In some preferred embodiments, the system further comprises at least one amplifier, such as a Raman amplifier, optically coupled to the optical fiber section.

In other preferred embodiments, the system further comprises a multiplexer for interconnecting a plurality of channels capable of carrying optical signals onto the optical transmission line, wherein at least one, more preferably at least three, and most preferably at least ten optical signals propagate at a wavelength between about 1260 nm and 1625 nm. Preferably, at least one signal propagates in one or more of the following wavelength regions: the 1310 nm band, the E-band, the S-band, the C-band, and the L-band.

In some preferred embodiments, the system is capable of operating in a coarse wavelength division multiplex mode wherein one or more signals propagate in at least one, more preferably at least two of the following wavelength regions: the 1310 nm band, the E-band, the S-band, the C-band, and the L-band. In one preferred embodiment, the system operates at one or more wavelengths between 1530 and 1565 nm.

In one preferred embodiment, the system comprises a section of optical fiber as disclosed herein having a length of not more than 20 km. In another preferred embodiment, the system comprises a section of optical fiber as disclosed herein having a length of greater than 20 km. In yet another preferred embodiment, the system comprises a section of optical fiber as disclosed herein having a length of greater than 70 km.

In one preferred embodiment, the system operates at less than or equal to about 1 Gbit/s. In another preferred embodiment, the system operates at less than or equal to about 2 Gbit/s. In yet another preferred embodiment, the system operates at less than or equal to about 10 Gbit/s. In still another preferred embodiment, the system operates at less than or equal to about 40 Gbit/s. In yet another preferred embodiment, the system operates at greater than or equal to about 40 Gbit/s.

In a preferred embodiment, a system disclosed herein comprises an optical source, an optical fiber as disclosed herein optically coupled to the optical source, and a receiver optically coupled to the optical fiber for receiving the optical signals transmitted through the optical fiber, the optical source having the capability of dithering, and/or phase modulating, and/or amplitude modulating, the optical signal generated by the optical source, and the optical signal is received by the receiver.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical waveguide fiber comprising:
   a central region extending radially outward from the centerline to a radius $R_1$ and having a positive relative refractive index percent, $\Delta_1\%$ (r) with a maximum relative refractive index percent, $\Delta_{1MAX}$;
   an annular ring region surrounding the central region and extending to a radius $R_3$ and having a positive relative refractive index percent, $\Delta_3\%$ (r) with a maximum relative refractive index percent, $\Delta_{3MAX}$; and
   an outer annular cladding region surrounding the annular ring region and having a relative refractive index percent, $\Delta_c\%$ (r);
   wherein $\Delta_{1MAX} > \Delta_{3MAX} > 0$;
   wherein the relative refractive index of the optical fiber is selected to provide an inner profile volume greater than 2%-$\mu m^2$, an outer profile volume no greater than 7.5%-$\mu m^2$, an effective area of greater than about 60 $\mu m^2$ at 1550 nm, an attenuation at 1550 nm of less than 0.21 dB/km, a positive dispersion at 1550 nm, a zero-dispersion wavelength of less than about 1500 nm, and a cabled cutoff less than 1250 nm.

2. The optical fiber of claim 1 wherein the annular ring region has a width $W_3$ greater than 2.5 $\mu m$.

3. The optical fiber of claim 1 wherein the annular ring region has a midpoint at greater than 7.0 $\mu m$.

4. The optical fiber of claim 1 wherein the annular ring region has a half-height width $HHPW_3$ greater than 2.5 $\mu m$.

5. The optical fiber of claim 1 wherein the annular ring region has a half-height midpoint $R_{3HHMID}$ at greater than 7.0 $\mu m$.

6. The optical fiber of claim 1 wherein the optical fiber has an outer profile volume greater than 6%-$\mu m^2$.

7. The optical fiber of claim 1 wherein the optical fiber has a product of ring volume and power less than 0.04%-$\mu m^2$-W.

8. The optical fiber of claim 1 wherein the annular ring region directly abuts the central region.

9. The optical fiber of claim 1 further comprising an annular moat region disposed between the central region and the annular ring region, wherein the annular moat region surrounds the central region and extends to a radius $R_2$ and has a non-negative relative refractive index percent, $\Delta_2\%$ (r).

10. The optical fiber of claim 1 wherein $\Delta1MAX$ is between 0.6% and 0.8%.

11. The optical fiber of claim 1 wherein $R_1$ is greater than 3 $\mu m$.

12. The optical fiber of claim 1 wherein the relative refractive index of the optical fiber is selected to provide a dispersion slope of less than 0.09 ps/nm$^2$/km at 1550 nm.

13. The optical fiber of claim 1 wherein the fiber has a dispersion at a wavelength of 1550 nm greater than about 3 $\mu s$/nm-km.

14. The optical fiber of claim 1 wherein the attenuation at a wavelength of 1550 nm is less than 0.20 dB/km.

15. A system comprising an optical source, a receiver, and the optical fiber of claim 1 optically connecting the optical source and the receiver, wherein the optical source is capable of generating optical signals in a wavelength range of 1530 to 1565 nm.

16. The optical fiber of claim 1 wherein the annular ring region has a width $W_3$ greater than 2.5 $\mu m$ and a midpoint at greater than 7.0 $\mu m$.

17. The optical fiber of claim 1 wherein the optical fiber has an outer profile volume between 6.1 and 7.5%-$\mu m^2$.

18. The optical fiber of claim 1 wherein the optical fiber has a product of ring volume and power less than 0.035%-$\mu m^2$-W.

19. An optical waveguide fiber comprising:
   a central region extending radially outward from the centerline to a radius $R_1$ and having a positive relative refractive index percent, $\Delta_1\%$ (r) with a maximum relative refractive index percent, $\Delta_{1MAX}$;
   an annular ring region surrounding the central region and extending to a radius $R_3$ and having a positive relative refractive index percent, $\Delta_3\%$ (r) with a maximum relative refractive index percent, $\Delta_{3MAX}$; and
   an outer annular cladding region surrounding the annular ring region and having a relative refractive index percent, $\Delta_c\%$ (r);

wherein $\Delta_{1MAX} > \Delta_{3MAX} > 0$;

wherein the relative refractive index of the optical fiber is selected to provide a product of ring volume and power less than 0.04%-μm²-W, an effective area of greater than about 60 μm² at 1550 nm, an attenuation at 1550 nm of less than 0.21 dB/km, a positive dispersion at 1550 nm, a zero-dispersion wavelength of less than about 1500 nm, and a cabled cutoff less than 1250 nm.

20. The optical fiber of claim 19 further comprising an annular moat region disposed between the central region and the annular ring region, wherein the annular moat region surrounds the central region and extends to a radius $R_2$ and has a non-negative relative refractive index percent, $\Delta_2\%$ (r).

21. The optical fiber of claim 19 wherein the optical fiber has an inner profile volume greater than 2%-μm².

22. A system comprising an optical source, a receiver, and the optical fiber of claim 19 optically connecting the optical source and the receiver, wherein the optical source is capable of generating optical signals in a wavelength range of 1530 to 1565 nm.

23. The optical fiber of claim 19 wherein the product of ring volume and power is less than 0.035%-μm²-W.

* * * * *

UNITED STATES PATENT AND TRADEMARK OFFICE
CERTIFICATE OF CORRECTION

| | |
|---|---|
| PATENT NO. | : 7,046,891 B2 |
| APPLICATION NO. | : 10/890597 |
| DATED | : May 16, 2006 |
| INVENTOR(S) | : Snigdharaj K. Mishra et al. |

It is certified that error appears in the above-identified patent and that said Letters Patent is hereby corrected as shown below:

Col. 18, line 30, "Δ1MAX" should read -- "$\Delta_{1MAX}$" --

Col. 18, line 39, "μs/nm-km." should read -- "ps/nm-km." --

Signed and Sealed this

Nineteenth Day of September, 2006

JON W. DUDAS
*Director of the United States Patent and Trademark Office*